(12) United States Patent
Zhao et al.

(10) Patent No.: US 7,822,801 B2
(45) Date of Patent: Oct. 26, 2010

(54) SUBSCRIPTION PROPAGATION IN A HIGH PERFORMANCE HIGHLY AVAILABLE CONTENT-BASED PUBLISH/SUBSCRIBE SYSTEM

(75) Inventors: Yuanyuan Zhao, Garnerville, NY (US); Daniel Charles Sturman, Englewood Cliffs, NJ (US); Sumeer Bhola, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1715 days.

(21) Appl. No.: 10/965,458

(22) Filed: Oct. 14, 2004

(65) Prior Publication Data

US 2006/0085507 A1 Apr. 20, 2006

(51) Int. Cl.
*G06F 15/16* (2006.01)
(52) U.S. Cl. ...................... 709/201; 709/231
(58) Field of Classification Search .................. 709/201, 709/231

See application file for complete search history.

(56) References Cited

U.S. PATENT DOCUMENTS

| | | | | |
|---|---|---|---|---|
| 6,304,892 B1 * | 10/2001 | Bhoj et al. | ................... | 709/202 |
| 6,327,699 B1 * | 12/2001 | Larus et al. | .................. | 717/128 |
| 6,339,767 B1 * | 1/2002 | Rivette et al. | ............... | 707/781 |
| 6,772,216 B1 * | 8/2004 | Ankireddipally et al. | .... | 709/230 |
| 6,839,730 B1 * | 1/2005 | Ramabhadran | ............. | 709/201 |
| 7,130,885 B2 * | 10/2006 | Chandra et al. | ............. | 709/206 |
| 7,529,811 B2 * | 5/2009 | Thompson | .................. | 709/219 |
| 2002/0116205 A1 * | 8/2002 | Ankireddipally et al. | ....... | 705/1 |
| 2004/0015812 A1 * | 1/2004 | Sreedhar | ...................... | 717/100 |

OTHER PUBLICATIONS

A. Carzaniga, D.S. Rosenblum, and A.L. Wolf, Design and Evaluation of a Wide-Area Event Notification Service, ACM Transactions on Computer Systems, 19(3):332-383, Aug. 2001.
R. Chand and P. A. Felber, A Scalable Protocol for Content-Based Routing in Overlay Networks, Proceedings of the IEEE International Symposium on Network Computing and Applications (NCA'03), Cambridge, MA, Apr. 2003.
B. Segall, D.Arnold, J.Boot, M.Henderson, and T. Phelps, Content Based Routing with Elvin4, AUUG2K, Canberra, Australia, Jun. 2000.
A. Snoeren, K. Conley and D. Gifford, Mesh-Based Content Routing using XML, Proceedings of the 18th ACM Symposium on Operating System Principles(SOSP 2001), Alberta, Canada, Oct. 2001.

(Continued)

*Primary Examiner*—Jeffrey Pwu
*Assistant Examiner*—Gerald Smarth
(74) *Attorney, Agent, or Firm*—George Willinghan; August Law, LLC (57) ABSTRACT

The present invention is directed to a publish/subscribe system containing a plurality of brokers, a plurality of subscribers and plurality of brokers including publisher connecting brokers, intermediate brokers and subscriber connecting brokers. Subscriptions are introduced into the system by the subscribers through associated subscription brokers. New subscriptions are aggregated, assigned a virtual start time and propagated through the system toward the publishers. Each broker maintains subscription information in the form of a directed acyclic graph and a broker vector. Messages are published through the system by the publishers through their associated publisher connecting brokers. Each message is assigned a message vector associating subscriptions to that message. The published messages are routed through the brokers toward the subscribers in accordance with comparisons of message brokers and vector brokers conducted at each broker.

1 Claim, 6 Drawing Sheets

OTHER PUBLICATIONS

G. Cugola, E. Di Nitto, and A. Fuggetta, The JEDI Event-Based Infrastructure and Its Application to the Development of the OPSS WFMS, IEEE Transactions on Software Engineering, 27(9):827-850, Sep. 2001.

B. Zhao, L. Huang, A. Joseph, and J. Kubiatowicz, Exploiting Routing Redundancy Using a Wide-area Overlay, Technical Report UCB/CSD-02-1215, University of California, Berkeley.

A. Rowstron, A. Kermarrec, M. Castro, and P. Druschel, SCRIBE: The design of a Large-Scale Event Notification Infrastructure, Proceedings of 3rd International Workshop on Networked Group Communication (NGC 2001), UCL, London, UK, Nov. 2001.

Y.Dalal and R. Metcalfe, Reverse Path Forwarding of Broadcast Packets, Commnunications of the ACM, 21 (12):1040-1048, 1978.

* cited by examiner

SUBSCRIPTION PROPAGATION IN A HIGH PERFORMANCE HIGHLY AVAILABLE CONTENT-BASED PUBLISH/SUBSCRIBE SYSTEM

FIELD OF THE INVENTION

The present invention relates generally to content-based publish/subscribe systems and more particularly to methods for propagating subscriptions and routing published messages from publishers to subscribers. Therefore, the invention can be utilized in systems that support reliable (i.e. in-order, gapless) delivery of messages utilized in addition to best-effort delivery.

BACKGROUND OF THE INVENTION

In content-based publish/subscribe systems, publishers post or publish information through the system, and subscribers specify interest in receiving certain information. Subscriber interest is specified using subscriptions that define predicates on the posted information. To improve performance in the delivery of information in the publish/subscribe system, broadcasting every message throughout the entire publish/subscribe system is avoided. In a content-based publish/subscribe system, the information requested varies by subscriber, and any one subscriber may only be interested in a very small portion of the overall amount of information published. For example, when the subscriptions in the publish/subscribe system overlap significantly and match only a small subset of all of the published information, most of the published information does not need to be broadcast throughout significant portions of the publish/subscribe system.

Publish/subscribe systems typically prevent this unnecessary flooding of published information throughout the system by propagating the subscriptions through the system to the publishers of the information and by using the propagated subscriptions to direct the routing of information through the system and to filter out published information that does not have to be routed. This routing and filtering is facilitated by the use of brokers disposed between the publishers and subscribers in the publish/subscribe system. Each broker contains the propagated subscriptions that are relevant to the subscribers to which the broker can route published information. In particular, each broker contains subscriptions for neighboring brokers and subscribers in the system. The broker uses the propagated subscriptions to filter the published information in accordance with the subscriptions as the information passes through the publish/subscribe system. This process is referred to as message filtering and can be used anywhere in the network, even in brokers that are in close proximity to the publishers that are posting the information. Therefore, only information that is relevant to downstream subscribers connected to the brokers is forwarded, and published information is not forwarded to brokers and subscribers in the publish/subscribe system that are not associated with matching subscriptions.

As more subscriptions are added to and propagated through the publish/subscribe system or as proximity to the publishers increases, the amount of information about subscriptions that is maintained in each broker for the purpose of information filtering and routing grows and can become cumbersome, adversely affecting the performance of the publish/subscribe system. Conventionally, publish/subscribe systems attempt to avoid this problem by using subscription aggregation or subscription consolidation. In subscription aggregation, for example, if information that matches a first subscription also matches a second subscription and both subscriptions are routed in the same direction with respect to a given broker, then only the second subscription is propagated. This aggregation process utilizes covering relationships among the subscriptions, and many publish/subscribe systems that implement subscription propagation utilize covering relationships among the subscriptions to reduce the volume of information propagated throughout the system and maintained at each broker.

In addition to attempting to match published information with subscriptions as efficiently as possible, publish/subscribe systems are operated to provide in-order, gapless delivery of published information. The need for providing in-order, gapless delivery of information, even in the presence of system failures, arises from service level agreements that dictate the need for an uninterrupted flow of information, e.g., it is unacceptable for certain stock traders not to be able to access a trade event that others can access, and from message interdependencies, for example when messages are used by a subscribing application to accumulate a view of an event and missing or re-ordered messages can cause an incorrect state to be displayed. Achieving the requirements within a single system for in-order, gapless delivery, high performance, scalability and high availability using conventional methods is very difficult.

Loss of connectivity by subscribers, publishers and brokers is common in wide-area network applications due to hardware and software failures and network mis-configurations. To increase system availability, some publish/subscribe systems are built on a redundant overlay network, which provides redundancy in the underlying network links. However, current systems do not efficiently exploit the available redundancy in the overlay network to recover from hardware and software failures in a timely and efficient process. In a typical redundant overlay network of brokers, multiple paths may exist between any two brokers in the network, and the publish/subscribe system automatically load balances published information traffic across these paths. When one of these paths is broken, for example due to a broker or link failure, the publish/subscribe system redirects the published information traffic to available alternate paths.

Conventional methods used to provide reliable delivery in redundant overlay networks, however, store persistently any messages or message meta-data on the routing path between publishers and subscribers. An approach to supporting reliable delivery without persistently storing messages or message meta-data on the routing path is described in (reference). However, that approach does not consider dynamic subscription changes caused by subscribers connecting or disconnecting from the system.

Known publish/subscribe systems that can handle dynamic subscription changes do not provide gapless, in-order delivery and do not utilize redundant paths existing in the broker networks. Therefore, the known system are not highly scalable and available.

Examples of publish/subscribe systems that support subscription aggregation to achieve scalability are found in A. Carzaniga, D. S. Rosenblum, and A. L. Wolf, *Design and Evaluation of a Wide-Area Event Notification Service*, ACM Transactions on Computer Systems, 19(3):332-383, August 2001 and R. Chand and P. A. Felber, *A Scalable Protocol for Content-Based Routing in Overlay Networks*, Proceedings of the IEEE International Symposium on Network Computing and Applications (NCA '03), Cambridge, Mass., April 2003. These applications also support a topology with multiple routes between servers; however, the subscriptions are only propagated along a single selected "best route" in a spanning tree. This limitation of propagating subscriptions along a single selected route makes the system slow and recovery from a spanning tree link failure by dynamically switching to another route difficult. In addition, these publish/subscribe systems do not provide a mechanism to share the load among multiple available paths and do not support reliable delivery.

In B. Segall, D. Arnold, J. Boot, M. Henderson, and T. Phelps, *Content Based Routing with Elvin*4, AUUG2K, Canberra, Australia, June 2000, the publish/subscribe system is architectured around a single server that filters and forwards messages directly to consumers. The system, however, does not address the issues of scalability or availability.

The publish/subscribe system discussed in A. Snoeren, K. Conley and D. Gifford, *Mesh-Based Content Routing using XML*, Proceedings of the 18th ACM Symposium on Operating System Principles (SOSP 2001), Alberta, Canada, October 2001 attempts to improve reliability with low latency by sending messages simultaneously over redundant links in a mesh-based overlay network. The protocol uses content-based routing and provides a high level of availability. However, there is no guarantee of in-order, gapless delivery when subscriptions are dynamically added and removed from the system.

G. Cugola, E. Di Nitto, and A. Fuggetta, *The JEDI Event-Based Infrastructure and Its Application to the Development of the OPSS WFMS*, IEEE Transactions on Software Engineering, 27(9):827-850, September 2001 discusses a publish/subscribe system that guarantees causal ordering of events, as a special case, The ordering of events is published by an entity called the Active Object. This system provides two implementations of the event dispatcher. The first version is a centralized version constituting a single process and addressing the requirements of simple systems. The second version is a distributed version constituted of a set of dispatching servers interconnected into a tree structure. This distributed version, while addressing part of the needs of Internet-wide distributed applications engaging in intense communication, does not accommodate and utilize redundant links between dispatching servers and hence is neither highly available nor easily used for load sharing.

The publish/subscribe system illustrated in B. Zhao, L. Huang, A. Joseph, and J. Kubiatowicz, *Exploiting Routing Redundancy Using a Wide-area Overlay*, Technical Report UCB/CSD-02-1215, University of California, Berkeley provides fault tolerant routing by dynamically switching traffic onto pre-computed alternate routes. Messages in this system can be duplicated and multicast "around" network congestion and failure hotspots with rapid re-convergence to drop duplicates. However, this system does not support content routing.

A. Rowstron, A. Kermarrec, M. Castro, and P. Druschel, *SCRIBE: The design of a Large-Scale Event Notification Infrastructure*, Proceedings of 3rd International Workshop on Networked Group Communication (NGC 2001), UCL, London, UK, November 2001 describes a large-scale and fully decentralized event notification system built on top of a peer-to-peer object location and routing substrate overlaid on the Internet. The event notification system leverages the scalability, locality, fault-resilience and self-organization properties of the object location and routing substrate. However, the event notification system does not support content-based routing. In addition, the event notification system builds a separate multicast tree for each individual topic. This multicast tree is created using a scheme similar to reverse path forwarding, a description of which can be found in Y. Dalal and R. Metcalfe, *Reverse Path Forwarding of Broadcast Packets*, Commnunications of the ACM, 21(12):1040-1048, 1978, so the route on which subscription messages were forwarded are inverted to become the route by which events are later distributed. This makes it impossible to add a redundant node to the multicast tree to share the load without requiring the total multicast tree to be rebuilt. Although the system can recover from multicast node failures by building a new multicast tree, this is done at a cost of reliable, in-order, gapless delivery. The applications must implement higher quality of service by themselves. In addition, an un-subscription in the event notification system has to be delayed until the first event is received.

Therefore, a need exits for a publish/subscribe system that provides for a guaranteed in-order, gapless content-based routing of messages while also achieving high performance, scalability and high availability. In addition, the publish/subscribe system should not require consensus or agreement between the redundant routing members, enabling them to serve as routing and processing alternatives to each other for fault tolerance and load sharing.

SUMMARY OF THE INVENTION

The present invention is directed to a publish/subscribe system and a method for propagating subscriptions and routing published messages through the system. The publish/subscribe system contains publishers that generate messages and subscribers that register interest in those messages. The system also includes a plurality of routing brokers operatively coupled to and in communication with one another over a redundant overlay network. Each broker can be configured as a publisher connecting broker, a subscriber connecting broker, an intermediate broker or combinations thereof. Each publisher connecting broker is in communication with one or more of the publishers, and each subscriber connecting broker is in communication with one or more subscribers. The subscriber connecting brokers are operatively coupled to the publisher connecting brokers via the network through the intermediate brokers. Therefore, messages are published to the system through the publication brokers, and subscriptions are propagated to the system through the subscription brokers.

The overlay network can be viewed as a spanning tree of cells connected by link bundles. The cells are nodes in the spanning tree topology and can be, for example, routers or servers. Although each broker can be one of the nodes in the spanning tree, preferably, the routing brokers are logical brokers. Therefore, each node can have one or more brokers associated with it, and each broker can have a presence in more than one node in the tree. Similarly, each link bundle can include more than one link. As part of the spanning tree topology, the nodes include root nodes, intermediate nodes and leaf nodes. Publisher connecting brokers are located at the root nodes, and subscriber connecting brokers are located at the leaf nodes. Therefore, the location where the publisher connecting brokers reside is referred to as upstream, and the location where the subscriber connecting brokers reside is referred to as downstream.

The system and method of the present invention are directed to content-based publish/subscribe systems in which each subscriber can request delivery of a unique set of messages. The system and method of the present invention provide subscription information for content-based routing in support of scalable, high performance, gapless message delivery. In addition, the publish/subscribe system of the present invention can operate asynchronously, i.e. the need for agreement or consensus among the redundant routes and routing brokers is eliminated.

Each published message is associated with a set of message subscriptions $S_m$ that identify the subscriptions to which each published message is to be delivered, subject to content matching. The publisher connecting brokers maintain a set of subscriptions and associate the appropriate set of messages subscriptions with messages published by publishers connected to them. Associated with each broker is a set of broker subscriptions $S_b$ that identifies the list of subscriptions for which that broker maintains information such as routing information and information regarding the status of the subscription. As each message is published to the system, the message is routed through the overlay network tree and through the brokers, from a publisher connecting broker to a subscriber connecting broker and if necessary through one or more intermediate brokers. The subscriber connecting broker is in communication with the subscribers associated with the subscriptions and maintains the most current information about each subscription. Each subscriber connecting broker uses this subscription information to deliver the published messages to the subscribers.

As the messages are published through the brokers, these messages are directed in accordance with the current active subscriptions so that the proper messages can be routed to the subscriber connecting brokers that need those messages for delivery to the subscribers. Proper routing through the brokers is accomplished by comparing $S_b$ to $S_m$ at each broker for each published message routed through that broker in addition to the result of content matching. Based upon this comparison and in particular on an identification of subscriptions that are both associated with the message and capable of being routed by the broker, the message is routed to downstream brokers and subscribers. For example, when the comparison indicates that all of the subscriptions contained within $S_m$ are also contained within $S_b$, i.e. $S_b$ is equivalent to or a superset of $S_m$, then the broker contains sufficient information regarding the routing of the message to its downstream brokers and subscribers and can match the subscriptions in $S_m$ to the subscriptions in $S_b$ and route accordingly. If $S_b$ is less than $S_m$, i.e. if $S_m$ contains at least one subscription that is not contained in $S_b$, then the broker lacks all of the information necessary to filter and route the subscriptions in $S_m$. Therefore, the broker routes the messages to its downstream brokers regardless of the matching result.

Due to effects such as latency in the publish/subscribe system and the addition and removal of subscriptions over time, a time element is associated with each subscription in $S_m$ and $S_b$. The set of message subscriptions $S_m$ is represented as a message vector $V_m$ containing a plurality of message vector elements that are preferably integers. Each message vector element represents a single subscriber connecting broker in the publish/subscribe system and contains the identification of all active subscriptions in $S_m$ associated with that subscriber connecting broker and having an associated virtual start time that is less than or equal to the vector element. The set of broker subscriptions $S_b$ is represented as a broker vector $V_b$ containing a plurality of broker vector subscription elements that are preferably integers. Each broker vector subscription element represents a single subscriber connecting broker in the publish/subscribe system and contains the identification of all active subscriptions in $S_b$ associated with that subscriber connecting broker and having an associated virtual start time that is less than or equal to the vector element.

The comparison of $S_m$ and $S_b$ is accomplished by comparing $V_m$ to $V_b$ on an element-by-element basis, that is comparing the active subscriptions in each message vector element to the active subscriptions in each broker vector element. This comparison is referred to as the sufficiency test, i.e. whether the broker has sufficient knowledge of all the subscriptions required by the published message for routing. If the comparison indicates that all of the active subscriptions contained in the message vector elements are also contained in the broker vector elements, then the broker associated with $V_b$ can perform subscription matching and routing in accordance with this matching. If the comparison indicates that the message vector elements contain at least one subscription not contained in the broker vector elements, then the message is routed to all brokers downstream of the broker associated with $V_b$. When comparing $V_m$ to $V_b$, the message vector and broker elements are compared to confirm that the broker vector elements are later than or equal to the corresponding message vector elements. By confirming that the broker vector elements are later than or equal to the message broker elements, the system confirms that the subscriptions located at the broker are at least as recent as the subscriptions associated with the published message. Therefore, the system avoids using old subscription information in the routing of newer published messages.

In general, virtual start times are assigned to new subscriptions by their connecting brokers. Each subscriber broker maintains a clock, for example a monotonic, integer-valued counter. New subscriptions are introduced to the publish/subscribe system of the present invention by subscribers through associated subscription connecting brokers, and these subscription brokers assign virtual start times to the new subscriptions based upon the values of their clocks. Active subscriptions, therefore, have virtual start times that are equal to or earlier than the current value of the clock contained in their associated brokers. Active subscriptions are those subscriptions that have not unsubscribed as of the current time.

The message vector element for each subscriber connecting broker indicates that the published message associated with the message vector should be delivered to all active subscriptions having a vector virtual start time earlier than or equal to the corresponding message vector element for the relevant subscription connecting broker. Thus, the $V_m$ vector associated with a published message forms a binding contract between the message and the brokers through which it is routed. The brokers match and filter the published message against all subscriptions having virtual start times earlier than the corresponding message vector elements for the relevant connecting brokers. However, if a broker lacks information about a subscription associated with the published message, then that broker does not route the published message in accordance with matching and filtering. Instead, the broker forwards the published message to all downstream brokers.

The method and system of the present invention consolidate or aggregate subscriptions using covering relationships. In general, each subscription can be defined as a plurality of logical conjunctions. Each conjunction in the plurality of conjunctions defines or specifies a set of published messages that are associated with the subscription. These logical conjunctions are aggregated so that repetitive conjunctions can be removed, thus reducing the number of conjunctions that have to be analyzed or considered by each broker during matching and routing of the published messages. Aggregation of the subscriptions can occur throughout the publish/subscribe system. The logical conjunctions of the subscriptions can be aggregated at subscriber connecting brokers, for example, as new subscriptions are added to the system. Alternatively, the logical conjunctions associated with the subscriptions can be aggregated at all brokers as subscriptions are added and propagated through the system.

Aggregation is facilitated by maintaining directed acyclic graphs (DAG's) at one or more of the brokers in the system.

Each DAG represents the logical conjunctions of each subscription in the $S_b$ associated with the broker at which the DAG is maintained. The maintenance of the DAG includes adding new conjunctions to the DAG and removing expired conjunctions from the DAG. Since each DAG is transitive along its branches, transitive arcs can be omitted from the DAG. When maintaining the DAG, covering relationships are used to identify uncovered conjunctions defining uncovered sets of published messages that are not the subset of any other set of published messages defined by other conjunctions. Therefore, uncovered conjunctions define unique sets of published messages. In addition, these covering relationships identify covered conjunctions that define covered sets of published messages that are subsets of one of the uncovered sets of published messages. Therefore, a covered conjunction does not define or identify a published message that is not already identified by another conjunction.

Since each subscriber connecting broker maintains a clock and uses this clock to assign virtual start times to subscriptions, the assigning of virtual start times is coordinated with the aggregation of the subscriptions. Each uncovered conjunction that is added to the DAG is assigned a virtual start time that is equivalent to the current value of the clock associated with the broker when the uncovered conjunction is added to the DAG. The clock time is advanced at the time the broker propagates the subscription changes. Covered conjunctions are assigned virtual-start times that are the minimum values of the virtual start times associated with its covering conjunctions. Since each subscription can contain a variety of covered and uncovered conjunctions, different virtual start times can be associated the different conjunctions of the same subscription. Overall, the virtual start time associated with each active subscription is set equal to the maximum value, i.e. the latest time, of the covered and uncovered conjunction virtual start times for the conjunctions contained in the active subscription.

The DAG from a subscriber connecting broker, is propagated through one or more additional brokers in the system. This propagation can take place in accordance with a predetermined time interval or in response to a change in the DAG. Propagation of the DAG includes propagating any changes to the uncovered or root conjunctions in the DAG, identifying the broker and possibly the node or cell propagating the DAG, identifying the current time on the clock contained in the identified broker at the time the change occurred, identifying the uncovered or root conjunctions to be removed from the DAG, identifying the uncovered or root conjunctions to be added to the DAG and providing a constraint vector. The constraint vector is a constraint on the value of the broker vector associated with the broker receiving the propagated change in the DAG. The form of the constraint vector is similar to the broker vector in that it is a vector of virtual times, with one element for each broker that can be associated with a subscriber. For example, the constraint vector identifies the oldest acceptable time, or virtual start times, for subscriptions in the broker vector of the receiving broker in order for the receiving broker to be able to accept and process the change. If the broker vector associated with the receiving broker is too old or out-of-date, then it may be missing intermediate changes that are necessary to process the current DAG changes.

Having received the propagated DAG changes and the associated constraint vector, the system confirms that the broker vector associated with the receiving broker satisfies the constraint vector. If the constraint vector is satisfied, the changes to the DAG are applied and the broker vector is updated accordingly, such as for example advancing the corresponding values in the broker vector. If the constraint vector is not satisfied, then the DAG changes cannot be applied. The system, however, can request an update from the sending broker of the latest state.

Subscriptions can be propagated as a best effort, hop-by-hop propagation. If redundant brokers exist in a given hop, the subscription message can be propagated farther without an agreement being reached among the redundant brokers. Therefore, each broker can handle a published message for a subscription even before it knows about the subscription, which makes a failover extremely easy.

DETAILED DESCRIPTION

An embodiment of a content-based publish/subscribe system in accordance with the present invention includes one or more publishers posting or publishing messages to one or more subscribers across a network containing a plurality of brokers. Suitable networks include local area networks (LAN), wide area networks (WAN) such as the Internet or World Wide Web, private area networks, secure area networks, public switched telephone networks (PSTN) and combinations thereof. The network is preferably an overlay network containing a plurality of connected cells or nodes. The brokers are disposed at one or more of these nodes and are in communication across the network. The plurality of brokers provide filtering and routing of published messages to the subscribers based, at least in part, on the content of the published messages and on filtering predicates provided by the subscribers. Therefore, redundant routes exist from each publisher to each subscriber through the plurality of brokers. The present invention allows a publish/subscribe system to take advantage of this redundancy in delivering published messages through the publish/subscribe system. The present invention, however, can function in the absence of this redundancy.

Methods in accordance with the present invention propagate subscriptions through the publish/subscribe system so that not only best-effort delivery but also in-order, gapless delivery, also referred to as reliable delivery, of published messages is supported. The publish/subscribe system can contain a plurality of published message streams. In reliable delivery, the publish/subscribe system finds a starting published message in each of the published message streams for each subscription and from that published message in the published message stream delivers all and only those published messages matching the subscription in an order consistent with the original published message stream.

For simplicity, embodiments are presented for reliable delivery from a single published message stream. However, each broker within the published/subscribe system can handle multiple, simultaneous published message streams and can perform different filtering and routing roles with respect to each one of the published message streams. When a single published message stream is considered, the brokers through which the single message stream is routed can be distinguished based upon the functionality these routers assume with respect to the published message stream. These functionalities include, but are not limited to, acting as a publisher hosting or connecting broker (PB), acting as an intermediate or routing broker (IB) and acting as a subscriber hosting or connecting broker (SB). The PB is the broker that is in first or immediate contact with a publisher and hosts the published message stream generated by that publisher. Similarly, the SB is the broker that is in first or immediate contact with a subscriber and hosts the subscriber including accepting subscriptions from the subscriber and propagating those subscriptions to the publish/subscribe system. Any number of IB's can exist between each PB and each SB. These IB's perform routing and filtering of published messages and propagating of subscriptions. In one embodiment, each broker is an independent entity having a single functionality. In another embodiment, any one broker performs two or more functionalities. Preferably, each broker is a logical broker or construct associated with the nodes or cells in the publish/subscribe system and representing either a single logical broker or a plurality of logical brokers. These nodes can represent routers, servers, computers or other hardware in the overlay network within the publish/subscribe system. In one embodiment, each broker is associated with a single node. In another embodiment, each broker participates in a plurality of nodes. For example, each broker can be a process or application running on a computer, or, to minimize delay due to system failures, a cluster of redundant processes nming in a distributed manner within multiple computers.

Figure 1:
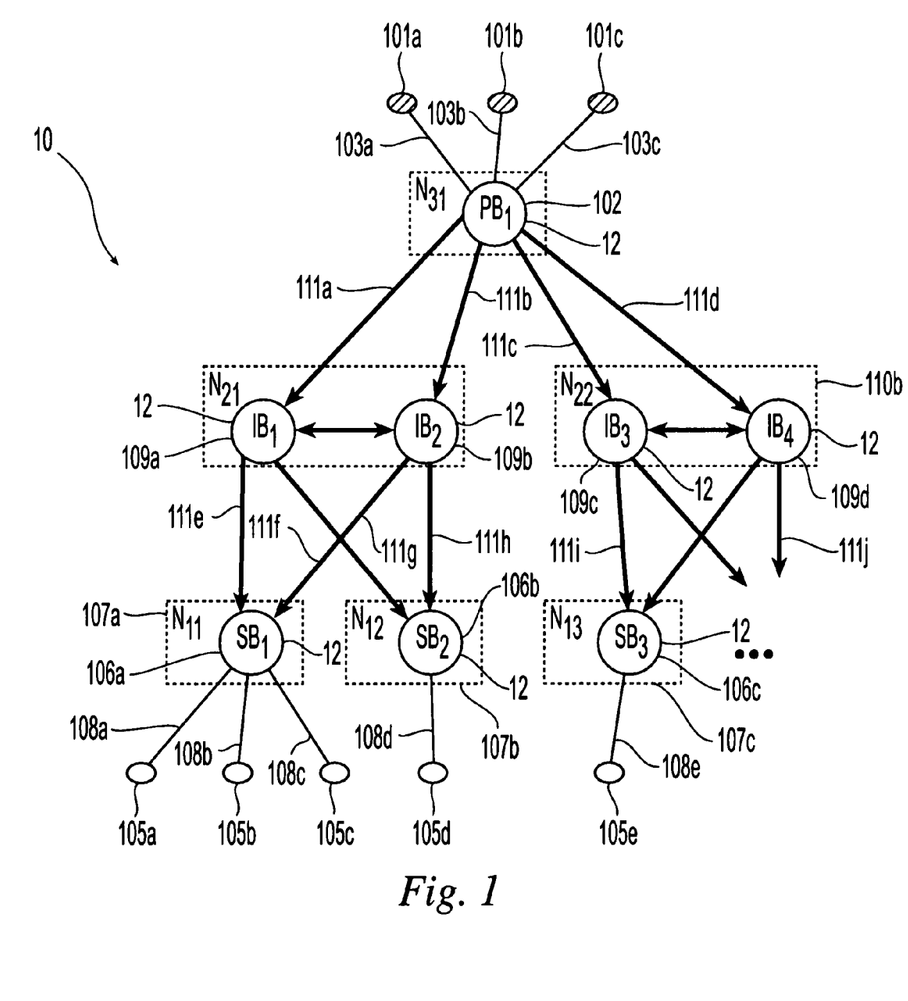
FIG. 1 is a schematic representation of an embodiment of a publish/subscribe system in accordance with the present invention.

Referring initially to FIG. 1, an embodiment of a publish/subscribe system 10 in accordance with the present invention is illustrated. The publish/subscribe system 10 contains a plurality of publishers 101a, 101b, 101c. Each publisher is capable of publishing messages or streams of messages through the publish/subscribe system 10. The system also includes a plurality of subscribers 105a, 105b, 105c, 105d, 105e, that are users or clients in the publish/subscriber system 10. Each subscriber is capable of creating and introducing into the system 10 one or more subscriptions that identify one or more sets of published messages that the subscriber wants to receive. Each subscriber is also capable of receiving published messages. Disposed between the subscribers and the publishers are a plurality of brokers 12. As illustrated, each broker 12 is associated with one or more nodes, $N_{11}, N_{12}, N_{13}, N_{21}, N_{22}, N_{31}$, in the system 10 forming an overlay network of redundant brokers between the subscribers and the publishers. The nodes represent routers, servers and other devices within the network.

Each broker 12 can serve one or more functions within the system 10. As illustrated, these functions include PB 102, SB 106a, 106b, 106c and IB 109a, 109b, 109c, 109d. Publishers 101a, 101b, 101c connect to the publish/subscribe system 10 through one or more PB's 102 across publisher connections 103a, 103b, 103c. In particular, the publisher connections run between a publisher and a PB 102 disposed at a node $N_{31}$.

Suitable publisher connections include any type of communication medium for conveying transmitted information, including a wireless communication link, such as, for example, infrared, radio frequency, satellite and microwave, and a dedicated communication connection, for example, telephone, cable and fiber optic. Preferably, the publisher connections are a reliable, first-in-first-out (FIFO) connection, including but not limited to, a Transport Control Protocol/Internet Protocol (TCP/IP) socket connection.

Subscribers 105a, 105b, 105c, 105d, 105e connect to the publish/subscribe system 10 through one or more subscriber connections 108a, 108b, 108c, 108d, 108e. In particular, the subscriber connections run between one or more subscribers 105a, 105b, 105c, 105d, 105e and one or more SB's 106a, 106b, 106c. Suitable subscriber connections are the same as for the publisher connections. The PB 102 and SB's 106a, 106b, 106c are connected to the plurality of IB's via interbroker connections 111a, 111b, 111c, 111d, 111e, 111f, 111g, 111h, 111i, 111j. In one embodiment, the interbroker connections utilize FIFO protocols, for example TCP/IP. Preferably, the interbroker connections utilize a faster, less reliable protocol since the delivery protocol of the present invention tolerates connection failures and message reordering, thereby increasing system throughput.

As illustrated, the arrangement of brokers 12 in the system 10 constitutes a logical tree structure. Root nodes in the tree are located close to the publishers and are associated with PB's. Leaf nodes are located close to the subscribers and are associated with SB's. IB's constitute the intermediate nodes in the tree structure. The interbroker connections form the branches of the tree structure. Messages introduced into the system 10 are published through the IB's in the tree from the root nodes to the leaf nodes. Subscriptions are propagated up through the IB's in the tree from the leaf nodes to the root nodes. Filtering and routing of the published messages is provided at each broker in accordance with the propagated subscriptions to provide for accurate and reliable delivery of the desired messages to the SB's and subscribers.

In one embodiment, each published message is associated with a set of message subscriptions $S_m$ that identify the subscriptions to which each published message is to be delivered. Each PB maintains a set of subscriptions for its connected publishers and generates an appropriate $S_m$ for each message published by these connected publishers. Associated with each IB and SB is a set of broker subscriptions $S_b$ that identifies the list of subscriptions for which each broker maintains information such as routing and delivery information and information regarding the status of the subscription. As each message is published through the system, the message is routed through the overlay network tree, from a PB through to one or more SB's and possible through one or more IB's. Each SB maintains the most current and complete information about each subscription for its connected subscribers. Each SB uses this subscription information to deliver the published messages to the subscribers.

As the messages are published through the brokers, these messages are directed in accordance with the current active subscriptions so that the proper messages can be routed to the subscriber connecting brokers that need those messages for delivery to the subscribers. Proper routing through the brokers is accomplished by comparing $S_b$ to $S_m$ at each broker for each published message routed through that broker. Based upon this comparison and in particular on an identification of subscriptions that are both associated with the message and capable of being routed by the broker, the message is routed to downstream brokers and subscribers. For example, when the comparison indicates that all of the active subscriptions contained within $S_m$ are also contained within $Sb_b$, i.e. $S_b$ is equivalent to or a superset of $S_m$, then the broker contains sufficient information regarding the routing of the message to its downstream brokers and subscribers and can match the published message using the subscriptions in $S_b$ and route accordingly. If $S_b$ is less than $S_m$, i.e. if $S_m$ contains at least one subscription that is not contained in $S_b$, then the broker lacks all of the information necessary to filter and route the subscriptions in $S_m$. Therefore, the broker routes all of the messages in $S_m$ to all of its downstream brokers.

In addition to identifying the types of messages desired and the subscribers desiring the messages, the present invention associates a time element with each subscription. In one embodiment, a virtual start time and a virtual end time is associated with each subscription. These virtual start times and virtual end times convey temporal relationships and dependencies among the subscriptions and messages. Each SB maintains a clock. Suitable clocks include 24 hour clocks, count-up timers, count-down timers, accumulators and counters including integer-valued counters. Preferably, the clock is a non-zero, integer-valued counter having an always increasing value. Clock values are preferably monotonically assigned to subscriptions. Virtual start times are assigned to each subscription by one of the brokers. In one embodiment, each SB assigns a virtual start time to new subscriptions submitted by the subscribers associated with the SB. The virtual start time is equivalent to the current value of the clock contained within the SB at the time the new subscription is received.

The combination of subscriptions, for example the subscriptions contained within $S_b$ and $S_m$, with virtual start times defines a vector representation of the subscriptions associated with each published message and the subscriptions maintained at each broker. In one embodiment, the set of message subscriptions $S_m$ is represented as a message vector $V_m$ containing a plurality of message vector elements. Each message vector element represents a single SB in the publish/subscribe system and contains the identification of all active subscriptions in $S_m$ associated with that SB and having an associated virtual start time less than or equal to the value of the vector element. The set of broker subscriptions $S_b$ is represented as a broker vector $V_b$ containing a plurality of broker vector elements. Each broker vector element represents a single SB in the publish/subscribe system and contains the identification of all active subscriptions in $S_b$ associated with that SB and having an associated virtual start time less than or equal to the value of the vector element. Preferably, a broker vector $V_b$ is maintained at each broker.

By propagating the virtual start times with the subscriptions, the routing brokers maintain not only information about what kind of data messages subscribing clients from each neighboring part of the network are interested in, but also a short digest of what the broker knows about the subscriptions of clients from the neighboring network.

When a data message is published by one of the publishers through an associated PB, a $V_m$ is assigned to the published message. As the message is routed or trasferred through the system, each broker compares its $V_b$ with the $V_m$ associated with the message for the SB's located downstream. If for all downstream SB's, the $V_b$ elements are at least the same as the $V_m$ elements, the broker can use matching and filtering to route the message. Therefore, if matching indicates that there are no matching subscribers downstream of the broker, the broker filters out the message and does not send the message downstream. However, if for some downstream SB's, $V_b$ is less than $V_m$, that is if $V_m$ contains at least one element not contained in $V_b$, the broker sends the message to all downstream brokers regardless of matching. Therefore, a comparison of $S_b$ to $S_m$ is accomplished by comparing $V_b$ to $V_m$.

$V_b$ is established and maintained at each broker in accordance with subscription information that is propagated up through the system from the subscribers to the publishers. In addition to propagating an identification of the subscription itself and the virtual start time associated with the subscription, a constraint vector is also provided. By comparing this constraint vector to the $V_b$ maintained by the broker, the broker determines if it's $V_b$ is equivalent to the constraint vector on the elements for the subscriber connecting brokers shown in the constraint vector, i.e. if the subscription information maintained at the broker is up-to-date. If $V_b$'s elements are the same as the constraint vector's for these subscriber connecting brokers, the subscription information maintained at the broker contains sufficiently up-to-date information to accept and to apply any changes associated with the propagated subscription. If, however, $V_b$ does not satisfy the constraint vector, the broker cannot apply the subscription changes. Therefore, $V_b$ needs to be updated before accepting the most recently propagated subscription.

Figure 2:
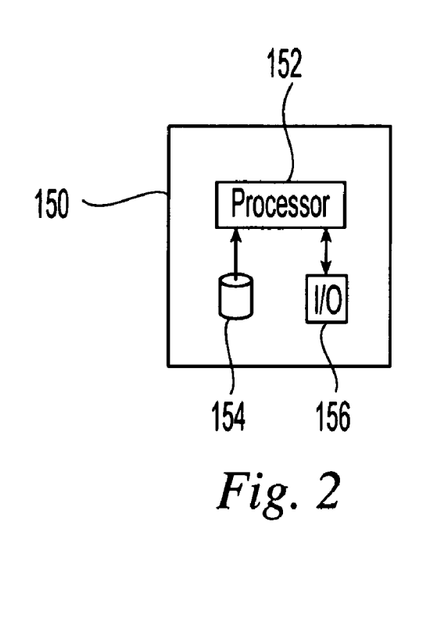
FIG. 2 is a schematic representation of an embodiment of a broker for use in the publish/subscribe system.

As shown in FIG. 2, an embodiment of a node or cell 150 within the publish/subscribe system that contains one or more brokers 12 is illustrated. The node 150 can be associated with any type of broker including a PB, SB, IB and combinations thereof. As illustrated, the node 150 contains a logical processor 152, a computer readable storage medium 154 and one or more input/output (I/O) devices 156. Suitable logical processors include, but are not limited to, a central processing unit (CPU) and a microprocessor. Although illustrated as a single logical processor, each node 150 can contain a plurality of logical processors, and elements associated with a processing device can be shared by other processing devices. Suitable computer readable storage mediums include memory and other computer-readable media associated with a processor or CPU, including, but not limited to, random access memory (RAM), read only memory (ROM), fixed storage media such as hard disk drives, removable storage media such as floppy diskettes, flash memory and combinations thereof. Suitable I/O devices include, but are not limited to keyboards, mice, network interface cards, printers, monitors and combinations thereof.

Accordingly, an application program, or software components thereof, including computer executable instructions or code for performing methods in accordance with the present invention is, in one embodiment, stored in one or more of the computer readable storage mediums 154. When the computer executable code is executed by the processor 152, the processor 152 performs a method in accordance with the present invention. Alternatively, the computer executable code can be stored in a computer readable medium and executed by a processor that is external to and independent of the nodes contained within the logical tree of the publish/subscribe system 10. Suitable equipment for the node 150 includes, but is not limited to a personal computer, a mainframe computer and a network server.

As subscriptions are propagated through the brokers 12 in the publish/subscribe system 10, these subscriptions are consolidated or aggregated. Any method capable of consolidating subscriptions while maintaining the necessary information for routing and delivery of published messages can be used. For example, each subscription can be represented as a disjunction of conjunctive filters by performing a disjunctive normal form (DNF) transformation of the Boolean expression of the content filter. In one embodiment, the consolidation and aggregation method takes advantage of the conjunctive expressions of the subscriptions. Preferably, the aggregation method utilizes covering relationships among the conjunctive filters. For example, when a broker receives a new propagated subscription containing a plurality of conjunctions, the broker checks each new conjunction against all of the existing conjunctions associated with subscriptions previously received by the broker and represented in the associated $V_b$ to determine if the published message sets defined by any of the new conjunctions are covered by any existing conjunctions. A new conjunction is covered by an existing conjunction if all published messages matching the new conjunction also match the existing conjunction.

Referring to FIGS. 3-6, the conjunctions at each broker are presented as nodes in a structure with edges drawn from covering conjunctions to covered conjunctions. Therefore, the subscriptions maintained at each broker, that is the subscriptions contained in $S_b$ or $V_b$, are represented by a partial order directed acyclic graph (DAG), which can also be referred to as a conjunction DAG'. Conjunctions that are not covered by any other conjunctions are called uncovered conjunctions and are represented as root nodes in the DAG. Therefore, logical conjunctions within each DAG are aggregated so that covered conjunctions do not need to be propagated to upstream brokers, thus reducing the number of conjunctions that have to be analyzed or considered by each broker during matching and routing of the published messages. Since each DAG is transitive along its branches, transitive arcs can be omitted from the DAG. In one embodiment, aggregation is performed at each SB, for example as new subscriptions are introduced into the system 10. In another embodiment, aggregation of subscriptions is performed throughout the publish/subscribe system 10 at each broker 12 as subscriptions are added and propagated through the system.

Each DAG represents the logical conjunctions of each subscription in the $S_b$ associated with the broker at which the DAG is maintained. Maintaining each DAG includes adding new conjunctions to the DAG and removing expired conjunctions from the DAG. When maintaining each DAG, covering relationships are used to identify uncovered conjunctions defining uncovered sets of published messages that are not the subset of any other set of published messages defined by other conjunctions. Therefore, uncovered conjunctions define unique sets of published messages. In addition, these covering relationships identify covered conjunctions that define covered sets of published messages that are subsets of one of the uncovered sets of published messages. Therefore, a covered conjunction does not define or identify a published message that is not already identified by another conjunction. The uncovered conjunctions are maintained and propagated to brokers in the upstream of this broker, and covered conjunctions while maintained, for example, in the SB's are not propagated upstream through the brokers in the system.

Figure 3:
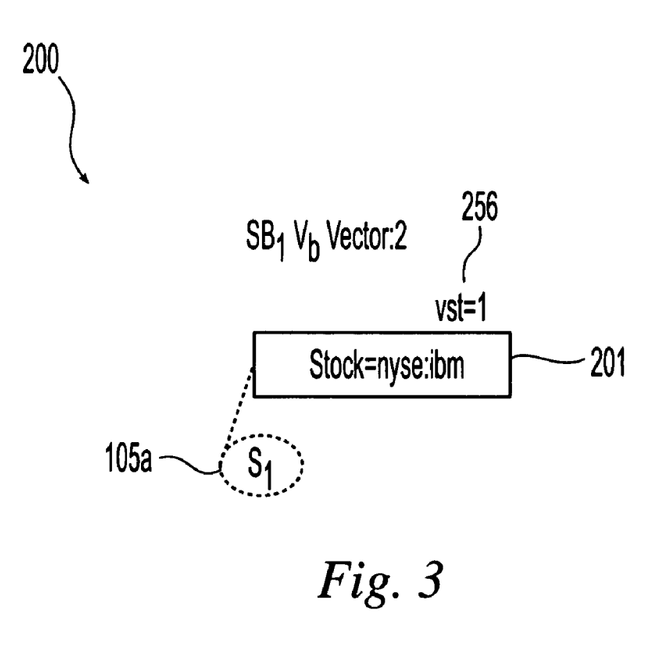
FIG. 3 is a schematic representation of an embodiment of a directed acyclic graph for use at a broker.
Figure 4:
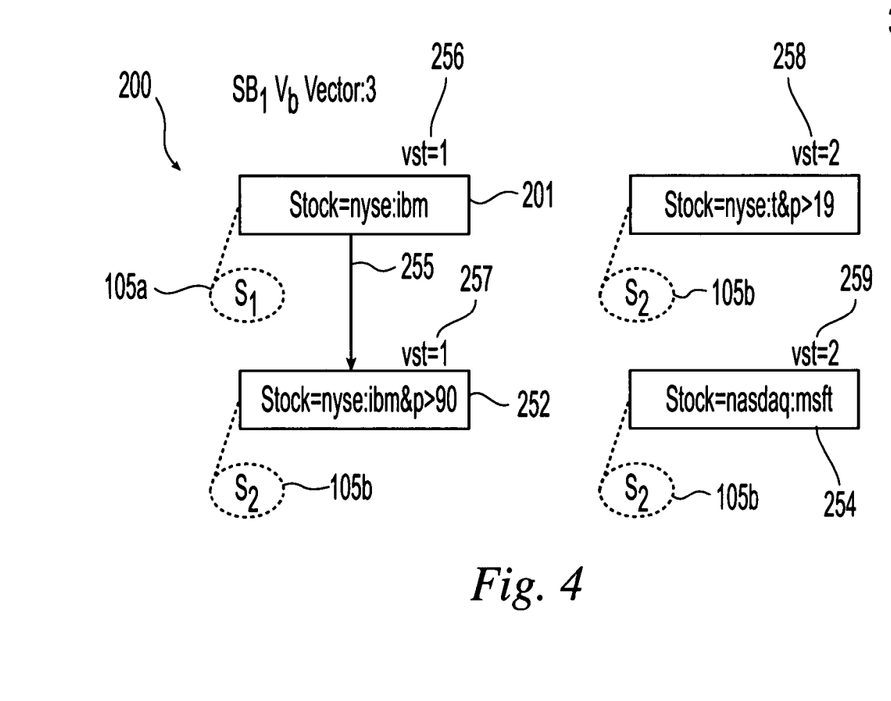
FIG. 4 is a schematic representation of another embodiment of a directed acyclic graph for use at a broker.

Referring to FIGS. 3 and 4, a DAG 200 for $SB_1$ 106a (FIG. 1) is illustrated both before and after the addition of a new subscription to the DAG. As shown in FIG. 3, before addition of a new subscription, the DAG contains an existing conjunction filter 201. As illustrated, the existing conjunction filter is "Stock=nyse:ibm". The existing conjunction filter 201 is associated with at least one subscriber 105a having a content filter conjunction containing the existing conjunction 201. A new subscription is introduced into the system 10 from a second subscriber 105b that is also associated with $SB_1$. As illustrated, the new subscription is "Stock=nyse:t&p>19 or Stock=nyse:ibm&p>90 or Stock=nasdaq:msft". This new subscription contains a first new subscription conjunction 252, "Stock=nyse:ibm&p>90", a second new subscription conjunction 253, "Stock=nyse:t&p>19", and a third new subscription conjunction 254, "Stock=nasdaq:msft". These new subscription conjunctions 252, 253, 254 are added to the DAG 200 of $SB_1$, aggregating in accordance with covering relationships. The updated DAG 200 is illustrated in FIG. 4.

The second and third new conjunctions 253, 254 define sets of published messages that are not contained within the set of published messages defined by the existing conjunction 201. Therefore, the second and third new conjunctions 253, 254 are added to the DAG 200 as root nodes. The first new conjunction 252, however, is covered by the existing conjunction since every published message in the set defined by "Stock=nyse:ibm&p>90" is also contained in the set of published messages defined by "Stock=nyse:ibm". Therefore, the first new subscription 252 is added to the DAG 200 as a child leaf node of the existing conjunction 201. Directed edge 255 between the existing conjunction 201 and the first new conjunction 252 represents this covering relationship.

In addition to analyzing each new subscription for covering relationships and integrating the new subscription into the DAG in accordance with these relationships, each SB assigns a virtual start time to the new subscription based upon the value of the clock maintained at the SB. In one embodiment, virtual start times are assigned to each conjunction in the new subscription, and the maximum value of these times is taken as the virtual start time of the new subscription. As shown in FIGS. 3 and 4, the existing conjunction 201 associated with an existing subscription has been assigned a virtual start time 256 equal to the clock value 1. The value of the clock associated with $SB_1$ has been incremented to the value of 2. When the new subscription is added at $SB_1$, the first new conjunction 252 is covered by the existing conjunction 201 and is assigned a virtual start time 257 equal to the existing conjunction virtual start time 256 of 1. In general for new covered conjunctions, the assigned virtual start time is the minimum value of the virtual start times of all its immediate parents. The second and third new conjunctions are not covered and are assigned virtual start times 258, 259 equal to the current value of the clock at $SB_1$, which is 2. The new subscription is thus assigned a virtual start time equal to 2, and the clock associated with $SB_1$ is incremented to the value 3 when $SB_1$ propagates this subscription change. This virtual start time is used by the system to determine the starting point in the stream of published messages for message delivery in accordance with the new subscription.

As illustrated, the clock maintained by $SB_1$ is an integer valued counter. This SB ensures the monotonicity of the highest value of this clock, even in the event of recovery from a system crash. Suitable methods for ensuring monotonicity include using a monotonic system clock and persisting an upper bound on the highest virtual clock time. Preferably, the clock values in accordance with the present invention do not overflow, which is reasonable for a clock value that is 64 bits or longer.

Referring again to FIG. 1, the SB's 106a, 106b, 106c propagate subscriptions through the system 10 toward the PB's. This subscription information includes the addition of new subscriptions and the removal of expired subscriptions that have uncovered conjunctions in the DAG. This information is propagated in accordance with certain configurable criteria. In one embodiment, the subscription information is propagated in accordance with pre-determined time intervals. In another embodiment, a SB propagates changes periodically if at least one new subscription addition or removal request has been received during a period. Preferably, a SB propagates subscription information every time a request to add or remove a subscription is received and if the additional or removal of the subscription changes the root nodes in its DAG. In one embodiment, when the SB propagate changes to the DAG, the SB propagates the change with its current clock value and increases the value of its clock. The propagated changes instruct IB's $109a$, $109b$ regarding the operations to be performed in order for these IB's to be able to match published data messages to the current subscriptions.

In one embodiment, the incremental changes are computed by indicating the root conjunctions nodes to be removed from or added to the DAG. Therefore, if there are no root conjunction nodes to be added or removed, there is no need to propagate any subscription information in response to the addition or removal of a subscription. As illustrated in FIGS. 3 and 4, the new subscription containing "Stock=nyse:t&p>19 or Stock=nyse:ibm&p>90 or Stock=nasdaq:msft" causes a subscription information to be propagated from $SB_1$ since only "Stock=nyse:ibm&p>90" is covered and "stock=nyse:t&p>19" and "stock=nasdaq:msft" are not. The propagated subscription information contains information including an identification of the originating SB, a value for the constraint vector and instructions for which conjunctions to add to or remove from the DAG. The constraint vector in the subscription information, for this embodiment, instructs the receiving broker to process this subscription information after it processes propagated subscription information having a virtual start time less than or equal to 1. Therefore, the constraint vector provides for the proper sequencing of subscription updates and the preservation of dependencies between subsequent updates. If subsequent to the addition of the new subscription, $SB_1$ receives the additional subscription "Stock=nasdaq:msft&p>24" from a subscriber, a subscription change will not be propagated because the only conjunction associated with this additional subscription is covered by the now existing conjunction "Stock=nasdaq:msft" in the DAG.

In one embodiment, dependencies between subscriptions are limited to subscriptions originating from the same SB. Therefore, upstream brokers 102, $109a$, $109b$ process subscription information changes having a virtual start time T from the SB after processing all subscription information changes from the same SB having virtual start times earlier than T. In the subscription "Stock=nyse:t&p>19 or Stock=nyse:ibm&p>90 or Stock=nasdaq:msft", since "Stock=nyse:ibm&p>90" is covered and thus not included in the subscription information change, a dependency of subscriptions with virtual start time equal to 2 is established on subscriptions with virtual start times equal to 1. In one embodiment, this constraint is simplified by assuming a dependency for all subscriptions from the same SB having a certain virtual start time T on all subscriptions from the same SB with virtual start times earlier than T. As the subscriptions are propagated through the system, each subscription change can be further aggregated with the existing subscription DAG's at each broker. This continuous aggregation can created new dependencies across SB's.

Figure 5:
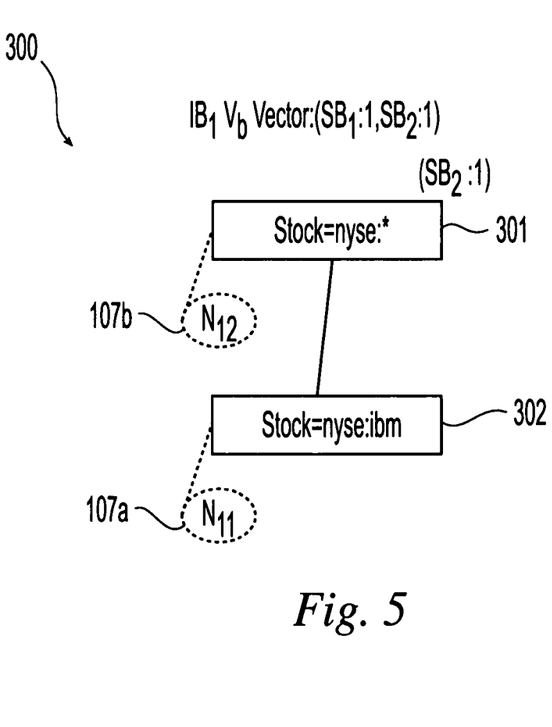
FIG. 5 is a schematic representation of an embodiment of a directed acyclic graph at a broker before processing a subscription update.
Figure 6:
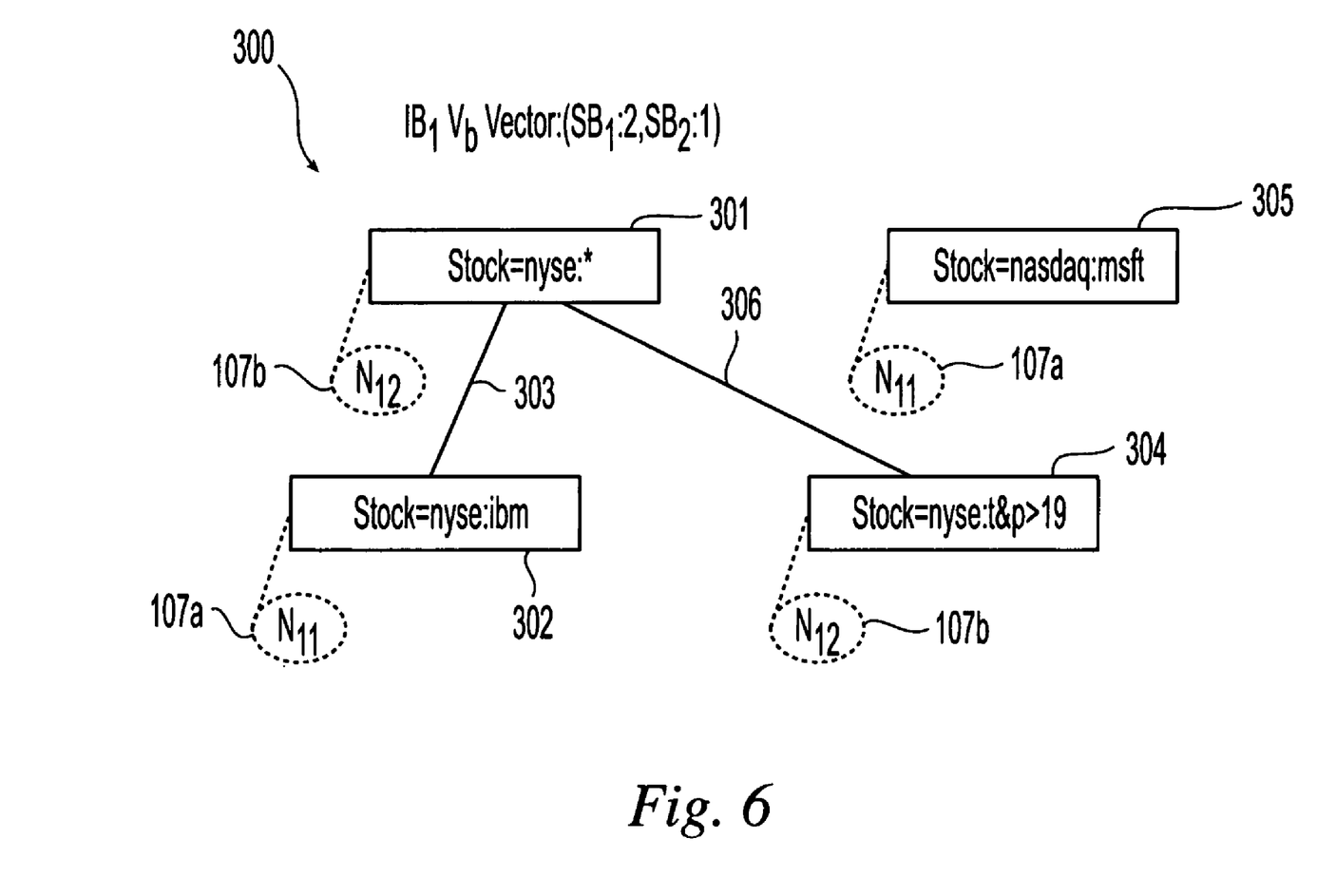
FIG. 6 is a schematic representation of an embodiment of a directed acyclic graph at a broker after processing a subscription update

Referring to FIGS. 5 and 6, a DAG 300 for IB, $109a$ is illustrated both before and after the propagation of subscription information. As illustrated, the propagated subscription information is propagated from $SB_1$ $106a$ to $IB_1$ $109a$ and contains an identification of $SB_1$ with a virtual start time equal to 2, a constraint vector equal to 1, an instruction to add the conjunction filter "Stock=nyse:t&p>19" and an instruction to add conjunction filter "Stock=nasdaq:msft". As shown in FIG. 5, the DAG 300 includes an existing root conjunction 301, "Stock=nyse:*", and an existing covered conjunction 302, "Stock=nyse:ibm". Directed edge 303 runs between the existing root conjunction 301 and the existing covered conjunction 302 and represents the existing covering relationship.

The propagated subscription information results in a new covered conjunction 304, "Stock=nyse:t&p>19". This conjunction 304 is covered by the existing root conjunction 301, "Stock=nyse:*", as indicated by the directed edge 306. Since the new conjunction is covered by the existing root conjunction 301 that was received at $IB_1$ from $SB_2$ $106b$ with a virtual start time equal to 1, i.e. $SB_2$:1, $IB_1$ does not need to propagate this new covered conjunction 304 further through the system 10. However, a dependency is created between $SB_1$ and $SB_2$, i.e. $SB_1$:2 depends on $SB_2$:1. This dependency is represented by the constraint vector. The propagated subscription information also results in a new uncovered root conjunction 305, "Stock=nasdaq:msft". Therefore, $IB_1$ propagates to $PB_1$ the consolidated subscription information containing an identification of $SB_1$ with virtual start time equal to 2, the constraint vector ($SB_1$:1, $SB_2$:1) and the instruction to add the conjunction "Stock=nasdaq:msft". $PB_1$ will process this message after it receives and processes all previously propagated subscription information from $SB_1$ having a virtual start time equal to 1, and all subscription information from $SB_2$ having a virtual start time equal to 1.

In one embodiment, subscription information is aggregated at each SB, reducing the volume of subscription information propagated through the system, because subscriptions that are completely covered by existing subscriptions do not incur changes outside of the SB. New subscriptions that are partially covered by existing subscriptions cause a reduction in the amount of propagated information because only conjunctions that are not covered need to be propagated, as incremental updates. Covered subscriptions are dependent on existing subscriptions at the SB. Therefore, incremental updates are processed by any receiving broker in the order indicated by their virtual clock times. In another embodiment, subscriptions are aggregated at each broker throughout the system. In this embodiment, the incremental updates are aggregated at intermediate brokers before propagating them upstream towards the PB's. This aggregation causes dependencies between subscriptions at different SB's. These dependencies are captured in a constraint vector that accompanies each incremental update. In order for the receiving broker to correctly process the subscription message, it is required to have a $V_b$ with the same value as the value of the constraint vector.

In one example, $IB_1$ $109a$ (FIG. 1) is associated with $V_b=\{SB_1:v_1, SB_2:v_2\}$ and it partially aggregates an incremental update from $SB_1$ that had a result version $v_1+1$, and the resulting update now depends on ($SB_2:v_2$). The new update will have a constraint vector ($SB_2:v_2$). The upstream broker $PB_1$ $102a$ applies this update if its $V_b$ vector is $\{SB_1:v_1,SB_2:v_2\}$, and the resulting state has $V_b=\{SB_1:v_1+1,SB_2:v_2\}$. Therefore, aggregation of subscription information only at SB's may result in more subscription message traffic than aggregating everywhere. Each broker also maintains larger subscription state in the former case because conjunctions from different SB's that are covered by others need to be maintained separately. Alternatively, aggregation only at SB's results in simpler computation having less restrictions on when an incremental update can be applied.

When subscriptions expire or are otherwise removed from the system 10, these modifications are also processed and propagated through the system toward the publishers. For example, if a root covering conjunction is removed from a DAG, all conjunctions that are directly covered by this root conjunction either explicitly or implicitly are resubmitted.

For example, if $IB_1$ receives a request to remove the existing root conjunction 301, "Stock=nyse:*", the existing covered conjunction 302, "Stock=nyse:ibm", and new covered conjunction 304, "Stock=nyse:t&p>19", are resubmitted. Therefore, if $IB_1$ generates the command to remove the conjunction "Stock=nyse:*" from the DAG, it also generates the commands to add conjunctions "Stock=nyse:ibm" and "Stock=nyse:t&p>19". If these commands result in new root conjunction changes in the DAG, then these changes are propagated farther through the system toward the publishers.

$PB_1$ cannot process this updated subscription information if there are additional conjunctions that depend on the removed conjunction "Stock=nyse:*", until $PB_1$ is provided with these additional conjunctions. These additional dependent conjunctions can be routed from peer brokers to $IB_1$, for example $IB_2$ 109b. Moreover, $PB_1$ might not be aware of these additional dependencies, because $IB_2$ would only have propagated the root conjunction. In one embodiment, $PB_1$ is checked for consistency with the $V_m$ associated with $IB_1$, the intermediate broker generating and propagating the subscription information. That is, the receiving broker's $V_m$ is checked against the $V_m$ associated with the propagating broker, in particular on the subscription elements for the downstream SB's in common. In general, this dependency model establishes an approach both for subscription aggregation and consolidation and for aggregation propagation by the brokers. An advantage of the method in accordance with the present invention is that there is no need to remember all the individual subscriptions and their virtual start times associated with each conjunction DAG node. Instead, the overall $V_b$ vector of each broker is used for the implementation.

The method and system in accordance with the present invention enables flexible propagation of subscription information, i.e. the addition and removal of subscriptions. An example of this advantage is illustrated by propagating subscription change information using only a single link in the plurality of bundled links connecting one cell to another cell. The subscription information reaches one broker in the cell and is then forwarded to all brokers operating within the same cell. This method is utilized to minimize inter-cell communication, since inter-cell communication is typically more expensive than intra-cell communication. However, the effectiveness of methods in accordance with the present invention is independent of this feature.

Each broker processes the changes indicated in the subscription information if the $V_b$ associated with the broker satisfies a constraint vector conveyed with the subscription information. If the constraint is not satisfied and the $V_b$ associated with the broker is not sufficiently up-to-date to accept the changes conveyed in the subscription information, then the broker can initiate an update sequence to bring its $V_b$ into compliance with the constraint vector. In one embodiment, each broker maintains a cache of the recently propagated subscription change information. When either propagated subscription messages are lost or in response to other system failures, the subscription information stored in the cache is used to reestablish the $V_b$ instead of having to initiate a full subscription state update.

Referring again to FIG. 1, messages are published by one or more of the plurality of publishers 101a, 101b, 101c through their associated PB 102. Each published message is assigned a position in a stream of publishing end points, called pubends, and is preferably logged to persistent storage within the PB. Before the PB forwards the published message downstream toward one or more SB's, it assigns a $V_m$ to the message. Preferably, the PB assigns monotonically non-decreasing $V_m$'s to published messages in the stream when each published message is forwarded through the system for the first time. For a given first and second published messages, if the second message is located later in the data stream than the first published message, the $V_m$ assigned to the second published message is element-wise greater than or equal to the $V_m$ assigned to the first published message. In one embodiment, the PB assigns monotonically non-decreasing $V_m$'s to each published message based upon the subscription information currently maintained at the PB.

The $V_m$ associated with each published message contains the set of subscriptions that the published message should be matched against as it is routed through the brokers in the publish/subscribe system. A broker can selectively route and filter a published message if it contains current subscription information for all of the subscriptions contained in the $V_m$ associated with a published message. For example, IB's 109a, 109b, 109c, 109d do not selectively route or filter published messages for which they do not maintain all of the associated subscriptions, either directly or indirectly through covering filters. The sufficiency of the $V_b$ associated with a broker is tested by comparing that $V_b$ to the $V_m$ assigned to the published message. If for SB's downstream of the broker, the value of the broker's $V_b$ elements is not less than those of the $V_m$ assigned to the published message, the broker can filter or remove published messages if none of the subscriptions maintained by the broker matches the published message. Alternatively, if the broker's $V_b$ elements are less than those of the $V_m$ assigned to the published message, a conservative routing approach is taken and the published message is routed to all downstream brokers.

Systems and methods in accordance with the present invention are also used to establish a starting point in the published message stream for the delivery of published messages in response to a propagated subscription; As the entry point of subscriptions, each SB maintains the most complete and up-to-date subscription information for each of its attached subscribers. In one embodiment, a SB determines the delivery starting point for a subscription by comparing the virtual start time associated with that subscription with the virtual start time of the corresponding subscription element in the $V_m$ associated with the published message. If the $V_m$ element is equal to or greater than, i.e. if the time associated with the $V_m$ element is concurrent with or later than, the subscription's virtual start time, delivery in accordance with the subscription is started. If the system only provides for the monotonicity of $V_m$ for messages that are sent for the first time but not for resent messages, then only first-time messages are used to determine this delivery starting point. In one embodiment, the virtual start time assigned to each subscription time is used as the starting point of delivery. The SB associated with the subscriber starts delivery of published messages when it receives the first data message having an associated $V_m$ with an element for that SB equal to or greater than the virtual start time of the subscription. This method and system in accordance with the present invention where published messages are assigned non-decreasing $V_m$'s and routing brokers do not filter published messages for which they do not maintain information for all of the subscriptions up to the times specified in the published message $V_m$ guarantees gapless, in-order delivery of published messages for each subscription. Additional discussion of gapless delivery and durable subscriptions in a content-based publish/subscribe system is found in U.S. patent application Ser. No. 10/177, 474, which is incorporated herein by reference in its entirety.

Figure 7:
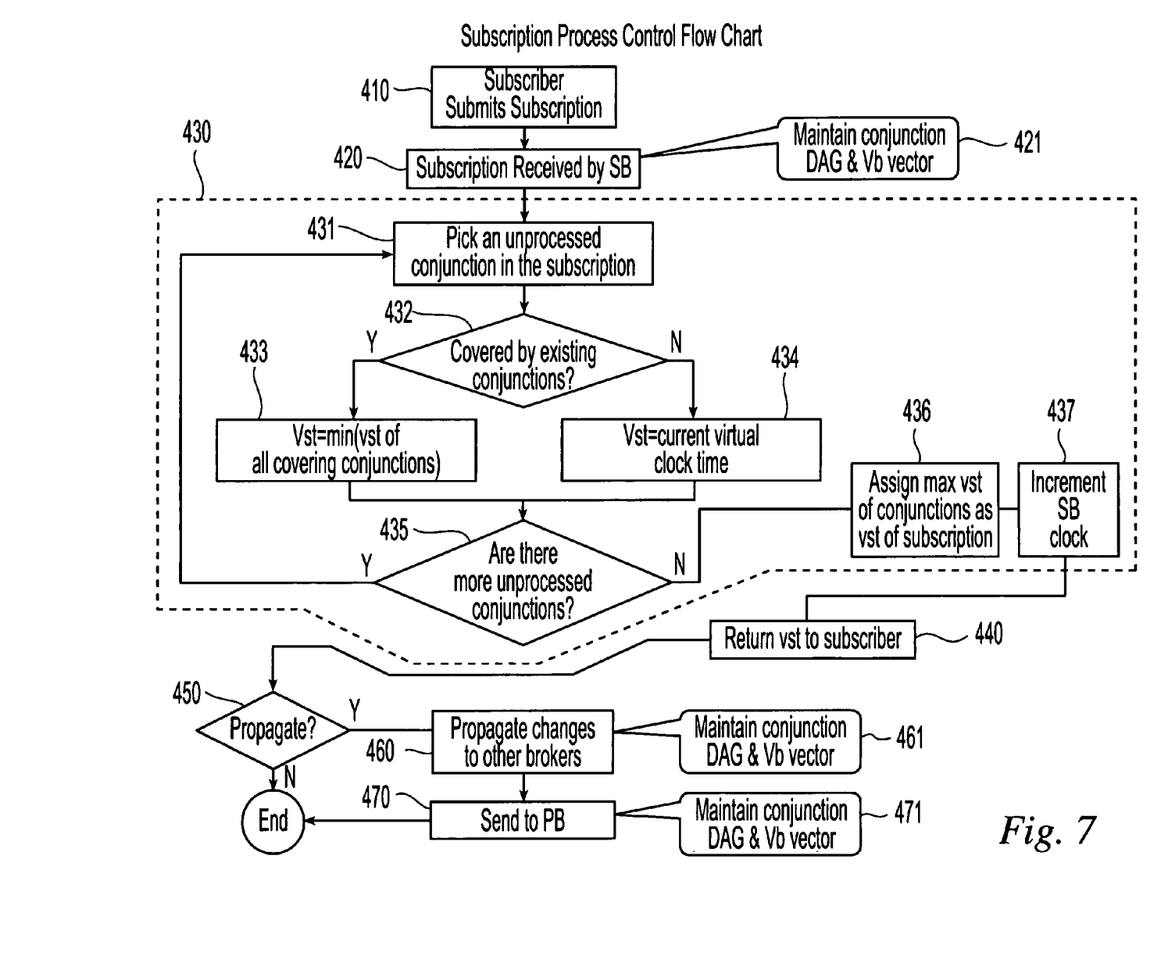
FIG. 7 is a flow chart illustrating an embodiment of a subscription propagation method in accordance with the present invention.

Referring to FIG. 7, an embodiment of a method for subscription propagation through a publish/subscribe system in accordance with the present invention is illustrated. A subscriber, for example a first subscriber 105a (FIG. 1), submits a new subscription 410 to the publish/subscribe system 10, and this new subscription is received by a SB 420 associated with the subscriber, for example $SB_1$ 106a (FIG. 1). In one embodiment, each subscription is represented as a disjunction of conjunction filters, for example by performing a DNF of the Boolean expression content filter. Therefore, each subscription can be referred to as a set of conjunctions. The SB associated with the subscriber that submits the new subscription maintains a clock, a DAG and a $V_b$ 421. The SB aggregates the conjunctions with its existing DAG and assigns a virtual start time to the new subscription in accordance with this aggregation 430. In order to aggregate the conjunctions contained in the new subscription, an unprocessed or unaggregated conjunction from the subscription is selected 431. This conjunction is then analyzed to determine if it is covered by any existing conjunctions in the DAG 432. If the conjunction is covered, the virtual start time associated with this conjunction is set to the minimum value of all the virtual start times of its immediate parents in the DAG 433. The covered conjunction is added to the DAG but not included for purposes of propagation. If the conjunction is not covered, the new conjunction is added to the DAG as a new root and is assigned a monotonically non-decreasing valued virtual start time equal to the current value of the clock maintained by the SB 434. The SB checks to see if the new subscription contains any more unprocessed conjunctions 435. If unprocessed conjunctions still exist, then another conjunction is selected and the process is repeated. If no more unprocessed conjunctions exist, then the SB assigns a virtual start time to the entire subscription that is equal to the maximum value of the virtual start times associated with the conjunctions 436, increments its clock 437 and reports the virtual start time of the subscription to the appropriate subscriber 440.

The SB then determines, based upon pre-defined criteria, whether or not to propagate the aggregated subscription information to other brokers upstream of the SB 450. Preferably, the SB propagates subscription information regarding changes to its aggregated DAG. If adding or removing a subscription does not result in a change to the root nodes in the DAG, then no information is propagated to the upstream brokers. If a determination is made to propagate, then the SB propagates the necessary subscription information, including an identification of the conjunctions to be added or removed and its virtual clock time to one or more upstream brokers 460. Each upstream broker, i.e. IB's, maintains a DAG and a $V_b$. In one embodiment, the new subscription information is aggregated into the existing DAG when the subscription information is propagated from the SB to an IB. The subscription information is propagated upstream until it is ultimately communicated to the PB associated with published messages in the set of any conjunctions that are to be added to or removed from a DAG 470. The PB also maintains a DAG and a $V_b$ 471 and can aggregate new subscription information into its existing DAG.

Figure 8:
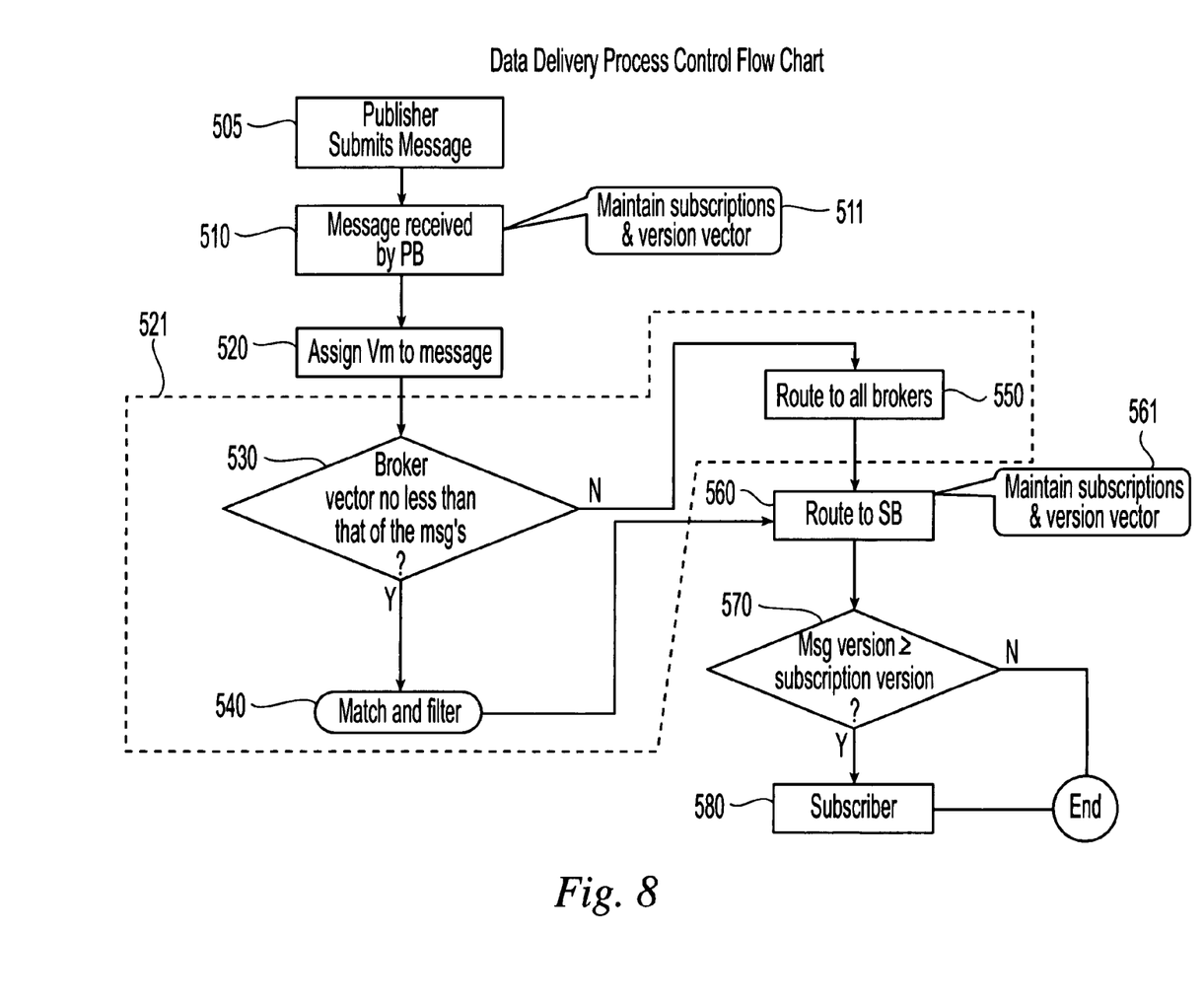
FIG. 8 is a flow chart illustrating another embodiment of the subscription propagation method.

Referring to FIG. 8, an embodiment of publishing a messaging through a publish/subscribe system in accordance with the present invention is illustrated. A publisher submits a data message to the system 505, and that message is received by its associated PB. The PB maintains subscription information in a DAG and a $V_b$ 511. The PB assigns a $V_m$ to the new published message 520. In one embodiment, the PB maintains previously assigned $V_m$'s in persistent storage to guarantee that the $V_m$ values assigned to new messages are in monotonically non-decreasing order. In another embodiment, the PB uses its DAG and $V_b$ to assign $V_m$. In this embodiment, the monotonicity of $V_m$ values assigned to data messages is not guaranteed, but the SB will check for monotonicity and send negative acknowledgements to retrieve the data messages with a $V_m$ that is sufficiently big. The published message is then routed through the brokers in the system 521. In one embodiment, the PB uses the conjunctions in its DAG to generate a list of next hop routing destinations for the published message and routes the message accordingly. At each broker, the PB checks if the $V_m$ is element-wise smaller than or equal to the broker's $V_b$ 530. If both conditions are met, the broker can match, filter and forward the published message in accordance with the subscriptions maintained at the broker 540. If this condition is not satisfied, then the broker forwards the message to all of its downstream brokers 550. Although illustrated for a single broker, the $V_b$ and $V_m$ comparison is executed both sequentially and in parallel for each broker in the network tree through which the published message is routed. Eventually, the published message is routed to one or more SB's 560. The SB, maintains a conjunction DAG and a $V_b$ 561. This $V_b$ contains only one element for the SB itself but maintains the most up-to-date and detailed subscription information for its attached subscribers. The SB generates a list of subscriptions matching the published data message, and checks for each new subscription, i.e., subscriptions for which the SB has not delivered any data message, whether to start deliver data message for it. The SB does so by comparing the data message's $V_m$ element for the SB with the virtual start time of the subscription 570. If the data message's $V_m$ element is no less than the virtual start time of the new subscription, the SB decides this is the delivery starting point for the subscription, and the SB delivers the data message to the appropriate subscriber 580. For subscribers for which delivery has already started and when monotonic non-decreasing $V_m$ are assigned, the SB delivers the message to the subscriber because the comparison of virtual start times is already satisfied. If non-monotonic $V_m$ assignment is used, the SB performs monotonicity checking on each data message to ensure a later message in the stream has a $V_m$ element for this SB that is no less than the earlier messages in the same stream. If the published message virtual start time is not greater than or equal to the virtual start time associated with the subscription, the SB issues a negative acknowledgment to the PB and requests that the published message be resent with a new $V_m$.

$V_m$ can be assigned to a message either monotonically or non-monotonically. Assigning $V_m$ monotonically to published messages requires the PB to persist the highest $V_m$ it has ever assigned, as was discussed earlier. The benefit of this approach is that $V_m$ only needs to be assigned to published messages and each SB does not need to check subsequent $V_m$'s once delivery has started for a subscription. Non-monotonic $V_m$ assignment does not require persistence of the highest $V_m$ at a PB. However, a subsequent published message can have a lower $V_m$, $(SB_1,2)$ than a previous message, $(SB_1,3)$, that is located earlier in the published message stream. If the subsequent published message is converted to a data message representing silence before it arrives at $SB_1$, then the subsequent published message might not be accepted, because the SB could have already started delivery for subscriptions with virtual start times equal to 3. Therefore, data messages representing silence also need to be assigned $V_m$ in addition to published messages. In the monotonic embodiment, algorithm $V_m$'s are assigned to published messages only, since that serves as an indication of the lower bound of the silence ticks that follow the data message. Silence ticks that do not have a high enough $V_m$ are rejected and negative acknowledgements are sent for these published messages. Negative acknowledgement messages contain $V_m$ indicating the minimum $V_m$ of the silence that is acceptable. For example, the negative acknowledgements in the above example will have $V_m=\{SB_1,3\}$, and therefore an IB with silence ticks having $V_m=\{SB_1,2\}$ cannot respond to those negative acknowledgements. Negative acknowledgement consolidation at IB's also takes into account the $V_m$.

In one embodiment, brokers other than PB's can change the $V_m$ assigned to published messages. The motivation for changing $V_m$ at IB's is that when subscriptions are aggregated at IB's, it is possible that an update can be completely aggregated into existing subscriptions, resulting in an update that is effectively empty. Therefore, this effectively empty update can either continue to be propagated until it reaches the PB's, or the propagation of this empty update can be stopped. Preferably, the effectively empty update is propagated until it reaches the PB's. The empty incremental update communicates the latest $V_m$ and $V_b$ information to the PB's. If the empty updates are stopped, the PB's do not see the empty updates, and the IB's record the fact that a message with $V_m=vv_1$ should be automatically changed to a message with $V_m=vv_2$, where $vv_2>vv_1$, since all the incremental subscription updates that change the subscription state from $vv_1$ to $vv_2$ are empty. It is possible that another broker in the same cell might not have received all the updates up to $vv_2$ and hence will not make the same change to $V_m$. This can result in non-monotonic $V_m$.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for propagating subscriptions to published messages across a network, the method comprising:

receiving subscriptions from a plurality of subscribers at a plurality of subscriber brokers in an overlay network comprising the plurality of subscriber brokers, a plurality of publisher brokers and a plurality of intermediate brokers disposed in a hierarchy between the plurality of subscriber brokers and the plurality of publisher brokers, each subscription comprising local conjunctions identifying a set of published messages;

aggregating the logical conjunctions at each subscriber broker associated with the subscriptions received at that subscriber broker into a separate directed acyclic graph for that subscriber broker that comprises a plurality of nodes representing the logical conjunctions associated with the received subscriptions;

identifying, for each directed acyclic graph at each subscriber broker, uncovered logical conjunctions in the logical conjunctions, the set of published messages associated with each uncovered logical conjunction is not a subset of any other set of published messages defined by other logical conjunctions;

identifying covered logical conjunctions in the logical conjunction, the set of published messages associated with each covered logical conjunction is a subset of one of the published messages defined by one of the uncovered logical conjunctions;

propagating, only the uncovered logical conjunctions through the hierarchy of intermediate brokers to the publisher brokers;

maintaining separate directed acyclic graphs comprising the propagated logical conjunctions at each intermediate broker and each publisher broker;

receiving messages from a plurality of publishers at the plurality of publisher brokers;

using the directed acyclic graphs located at each publisher broker, intermediate broker and subscriber broker to route the received messages from the publisher brokers through the intermediate brokers to the subscriber brokers by determining based on the directed acyclic graph located at a given publisher broker, intermediate broker or subscriber broker if that publisher broker, intermediate broker or subscriber broker has sufficient subscription information to match a given received message to subscriptions and to route the given received message to downstream brokers or to not match the given received message and to route the given received message to all downstream brokers; and delivering the messages from the subscriber brokers to appropriate subscribers.

* * * * *